US007453224B2

(12) United States Patent
Sullivan

(10) Patent No.: US 7,453,224 B2
(45) Date of Patent: Nov. 18, 2008

(54) SENSING MECHANICAL TRANSITIONS FROM CURRENT OF MOTOR DRIVING HYDRAULIC PUMP OR OTHER MECHANISM

(75) Inventor: James D. Sullivan, Galena, OH (US)

(73) Assignee: InPower LLC, Galena, OH (US)

( * ) Notice: Subject to any disclaimer, the term of this patent is extended or adjusted under 35 U.S.C. 154(b) by 573 days.

(21) Appl. No.: 11/319,826

(22) Filed: Dec. 28, 2005

(65) Prior Publication Data

US 2006/0145651 A1 Jul. 6, 2006

Related U.S. Application Data

(60) Provisional application No. 60/640,548, filed on Dec. 30, 2004.

(51) Int. Cl.
*H02P 7/06* (2006.01)

(52) U.S. Cl. ......................... 318/433; 318/629; 307/27; 307/24; 363/1; 363/39; 363/157; 340/658

(58) Field of Classification Search ................... 307/27, 307/24; 363/1, 39, 157; 340/658; 318/433, 318/629

See application file for complete search history.

(56) References Cited

U.S. PATENT DOCUMENTS

| | | | | | |
|---|---|---|---|---|---|
| 4,671,524 | A * | 6/1987 | Haubenwallner | ........... | 280/212 |
| 4,724,332 | A * | 2/1988 | Finger | ....................... | 307/10.7 |
| 4,924,166 | A * | 5/1990 | Roussel | ...................... | 318/608 |
| 5,170,433 | A * | 12/1992 | Elliott et al. | ................ | 704/226 |
| 5,556,250 | A * | 9/1996 | Fretwell et al. | ............. | 414/558 |
| 6,838,854 | B2 * | 1/2005 | Inagaki et al. | .............. | 318/701 |
| 6,848,579 | B2 * | 2/2005 | Cleaver | ...................... | 206/454 |
| 6,859,030 | B2 * | 2/2005 | Otte | ........................... | 324/166 |
| 7,276,877 | B2 * | 10/2007 | Qiu et al. | .................... | 318/721 |

* cited by examiner

*Primary Examiner*—Rita Leykin
(74) *Attorney, Agent, or Firm*—Frank H. Foster; Kremblas, Foster, Phillips & Pollick

(57) ABSTRACT

A circuit and method for detecting an operating transition of a mechanical apparatus driven by a hydraulic prime mover comprising a hydraulic pump driven by an electric motor, the operating transition causing a change in the force applied by the mechanical apparatus on the prime mover. A motor current sensing circuit is connected in a motor power supply circuit to provide a motor current signal representing motor current. A bandpass filter receives the motor current signal and provides a filtered motor current signal consisting essentially of motor current signal components in the frequency range from a lower frequency boundary greater than zero Hz to an upper frequency boundary below substantially all the motor noise frequencies. A comparison circuit compares the filtered motor current signal to a first selected threshold level and outputs a signal representing the occurrence of the operating transition when the filtered motor current signal exceeds the selected threshold level. The circuit is preferably implemented with a digital controller programmed to perform these operations.

13 Claims, 8 Drawing Sheets

SENSING MECHANICAL TRANSITIONS FROM CURRENT OF MOTOR DRIVING HYDRAULIC PUMP OR OTHER MECHANISM

CROSS-REFERENCES TO RELATED APPLICATIONS

This application claims the benefit of U.S. Provisional Application No. 60/640,548 filed Dec. 30,2004.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to systems having an electric motor driving a mechanical apparatus and more particularly relates to the detection of mechanical loading transitions of the mechanical apparatus by monitoring motor current and is particularly useful as a backup system to conventional limit switches of other devices commonly used to detect the position of a component of the mechanical apparatus.

2. Description of the Related Art

There are many types of machines that transport people or move mechanical apparatus in the vicinity of people or otherwise require reliable control so they do not malfunction and cause personal injury or property damage. One of the most common electrical loads associated with such machines is an electric motor that is or drives a prime mover to move the mechanical apparatus. Such machines should not only operate when they are signaled or otherwise commanded to operate, but of more critical importance to safety is that they stop operating when they are signaled or otherwise commanded to stop. Although the invention is applicable to a broad variety of machines with electrical loads that have such control and safety requirements, it is illustrated in connection with one such machine, a wheelchair lift having an electric motor driven hydraulic pump as its prime mover.

Many buses and vans are equipped with hydraulic wheelchair lift systems. In wheelchair lift systems, safety is probably the single most important factor. These lifts transport people who have a physical disability and it is particularly desirable to avoid jeopardizing them with apparatus that has the possibility of failing and causing personal injury.

Typically, these lift systems consist of a platform that can be folded and unfolded between a vertically oriented, stowed position in the vehicle and an unstowed, transporting position horizontally extending from the vehicle floor. From its unfolded or unstowed position, the platform can be raised and lowered between the vehicle's floor level and the ground level like an elevator. The lift of FIG. 1 is a typical wheel chair lift system. Most such prior art lift systems use essentially the general principles that are illustrated. The lift allows a person in a wheelchair to roll along the ground and onto the lift platform to be raised into the vehicle. The platform is then raised from ground level up to the vehicle's floor level. After reaching the floor level, the person rolls from the platform into the vehicle. Then the person operates the mechanism to cause the platform to pivot into the vehicle and stow the lift in the vehicle.

To minimize the cost and complexity of a wheelchair lift system, it is advantageous to perform the platform lifting function and the stowing function utilizing a single hydraulic cylinder or two or more cylinders operated hydraulically in parallel, such as illustrated in FIG. 1. As known to those skilled in the art, the hydraulic cylinder can be located to either push or pull in order to raise the lift, depending upon which obliquely opposite pivots it is connected to in the parallelogram arrangement that supports the platform.

FIG. 2 shows the fundamental mechanical structures of a typical wheel chair lift system that incorporates a hydraulic cylinder 1 to perform both the wheelchair lowering and lift functions and the platform deployment and stow functions. The system includes a first fixed vertical pillar 2 that is securely attached to the vehicle. A lifting platform 3 is attached to a second, vertically movable, vertical pillar 4 at a hinging pivot 5. A brace 9 is attached between the vertical pillar 4 and the platform 3 in such a fashion as to limit the range of motion of platform 3 around hinging point 5 so that it can pivot to no more than a 90° angle to the vertical pillar 4. The vertical pillars 2 and 4 are mechanically coupled to each other with two parallel equal length arms 6 and 7 that are hinged at their attachment points to the vertical pillars 2 and 4. The hydraulic cylinder 1, when operated, raises the platform 3 from ground level up to vehicle floor level. Whenever the platform 3 is raised above floor level, a stop 8 engages a platform protrusion **3*a* which directs the motion of the platform 3 around its hinging point 5 causing the platform 3 to fold, that is to pivot upwardly about its pivot axis 5** near its innermost edge until it reaches a substantially vertical orientation.

This operation is illustrated in more detail in FIG. 3. A wheelchair lifting cycle begins, as illustrated in FIG. 3A, with the wheelchair lift system fully deployed so that the platform 3 is resting at ground level. In this position a wheelchair can easily be rolled on to or off of the platform. Pumping fluid into the hydraulic lifting cylinder 1 causes the second vertical pillar 4 and platform 3 to rise with respect to vertical pillar 2 from ground level towards the vehicle floor level as shown in FIG. 3B. The lifting cycle is completed when platform 3 reaches the vehicle's floor level as shown in FIG. 3C. In this position a wheelchair can easily be rolled between the pillars into or out of the vehicle.

Once the lift has served its purpose to raise the user to the vehicle floor level, the lift needs to be stowed. A stow cycle begins with platform 3 at vehicle floor level as illustrated in FIG. 3D. The mechanical structures are so arranged that after the platform reaches floor level, application of more force from the hydraulic cylinder causes the platform to pivot around its pivot point 5 because further vertical movement of the platform is limited by the floor level stop 8. Pumping fluid into the hydraulic cylinder causes the second vertical pillar 4 to rise with respect to vertical pillar 2 in turn forcing platform 3 to fold around pivot 5 as shown in FIG. 3E because the protruding part **3*a* of the platform 3 engages the stop 8, causing the platform to fold in against the pillars as the pillars 2 and 4 are driven together by the hydraulic cylinder, as shown in FIGS. 3D-3F. The stowing cycle is complete when platform 3 is fully recovered to its vertical stowed position as shown in FIG. 3**F.

These operations are reversible. Releasing fluid from hydraulic cylinder 1 when platform 3 is in the fully stowed position, as shown in FIG. 3F, allows the force of gravity to first cause the second vertical pillar 4 to descend with respect to the first vertical pillar 2 allowing platform 3 to unfold around pivot 5. The unstow operation is complete when platform 3 is fully deployed and is parallel to and level with the vehicle's floor as shown in FIG. 3C. From this position a wheelchair can easily be moved from the vehicle onto the platform. Releasing additional fluid from the hydraulic cylinder 1 causes the second vertical pillar 4 and platform 3 to descend with respect to the first vertical pillar 2 from vehicle floor level to ground level. The platform lowering operation is complete when platform 3 reaches ground level as shown in FIG. 3A.

Turning now to the electrical and hydraulic circuitry, FIG. 4 illustrates a basic prior art hydraulic circuit and electrical controlling circuit for a wheelchair lift system described above although some conventional, prior art components and options are not included.

The hydraulic circuit includes a hydraulic lifting cylinder 11, an electric motor driven hydraulic pump 12, a normally closed, electrically energized, hydraulic fluid bypass valve 13 and a hydraulic fluid reservoir tank 14. A battery BAT is connected to a contactor 15 that operates as a power switch to control electrical current through the electric motor of the electric motor driven hydraulic pump 12. The electric motor is not directly switched on and off by a mechanical, hand-held switch because the motor currents are too large and would require an excessively large electrical cable in the user's hand to control the lift. So the separate contactor or power switch 15 is used. When electric power is applied to the hydraulic pump 12, fluid is pumped from the reservoir tank 14 to the lifting cylinder 11. Check valves internal to the hydraulic pump 12 prevent reverse hydraulic fluid flow through the pump. When power is applied to the bypass valve 13 and if the hydraulic lifting cylinder 11 is under pressure from a force applied to it, such as gravity, hydraulic fluid will return from the lifting cylinder 11 through the bypass valve 13 to the reservoir tank 14.

Low current switches 16, 17, 18, 19 and 20 control the power contactor 15. These include four separate hand control switches 17, 18, 19 and 20. Two of these switches, 17 and 18 can apply power to the contactor, closing its high current circuit and thereby applying current to the electrical motor to cause the motor to operate and develop hydraulic pressure for raising the lift. Two other switches 19 and 20 operate the bypass valve 13 causing fluid to drain from the hydraulic cylinder for its lowering movement. Each of the two sets of hand control switches is controlled by a fifth switch 16, and that fifth switch is mounted to the lift as a limit switch to be engaged and change state when the platform reaches the vehicle's floor level. Consequently, when the platform 3 is at ground level or at any intermediate position between the positions of FIG. 3A and 3C, switch 16 is in the state illustrated in FIG. 4. When the platform is rising and arrives at the position of FIG. 3C, the switch 16 switches to the opposite state and is in that state at every position above that.

There are four distinct functions performed by the wheelchair lift system described above which are:

1. Raising the platform
2. Stowing the platform
3. Deploying the platform
4. Lowering the platform When the platform 3 is at ground level, switch 16 can supply power to switches 18 and 19. Switch 18 controls raising the platform. If platform 3 is below floor level, switch 16 connects the battery positive terminal to switch 18. Manually closing switch 18 connects the battery positive terminal to power contactor 15 in turn switching battery positive to apply battery voltage to the hydraulic pump 12. Unless switch 18 is opened, the hydraulic pump continues to operate until the platform reaches floor level at which time switch 16 changes state and removes battery power from switch 18 and the power contactor 15. When it does, the circuit to the contactor 15 through switch 18 is opened which interrupts the motor current and automatically stops the ramp at that level. At that point the user gets off the lift platform and then wants to stow the lift.

The user initiates stowing of the lift by pushing the stow button, to close switch 17 which controls stowing the platform. Manually closing switch 17 connects the battery positive terminal to power contactor 15 in turn switching battery positive to the electric motor of the hydraulic pump 12. The hydraulic pump operates raising the platform 3 from the vehicle floor level position to the fully stowed position at which time the switch 17 is manually released by the user. Of course a limit switch can be included to assure that the electric motor ceases operation.

Switch 20 controls deploying the platform. If platform 3 is above floor level, switch 16 connects the battery positive terminal to switch 20. Manually closing switch 20 connects battery positive to the hydraulic bypass valve 13 operating it to cause hydraulic fluid to drain from hydraulic cylinder 11 to reservoir tank 14. The hydraulic cylinder 11 retracts until the platform reaches floor level at which time switch 16 changes state and removes battery power from switch 20 and the hydraulic bypass valve 13.

Switch 19 controls lowering the platform from the vehicle floor level. Switch 16 connects the battery positive terminal to switch 19. Manually closing switch 19 connects battery positive to the hydraulic bypass valve 13 operating the valve 13 causing hydraulic fluid to drain from hydraulic cylinder 11 to the reservoir tank 14. The hydraulic cylinder 11 retracts until platform 3 reaches ground level or switch 19 is released.

Safety is the first consideration in the operation of any wheelchair lift system. Safe operation also depends on accurately sensing platform position in relation to vehicle floor level. The failure of any single component, switch, sensor or control should not affect safe operation. Examining the schematic in FIG. 4 reveals a potential safety problem. Switch 16 is the switch that changes from a first state to a second state when the ramp arrives at vehicle floor level. If position-sensing control switch 16 develops a mechanical failure of its mechanism that causes it to change states when it is not supposed to, or an electrical failure that its contacts would not change state, it is possible that the platform would not automatically stop at vehicle floor level during a lifting cycle but instead would immediately transition into a stowing cycle and rise right past floor level and toward a stowed position. Serious injuries could result to a person on the platform.

There are ways of dealing with the potential failure of switch 16. For example, two redundant switches can be used. Alternatively, there could be a light beam and light sensor to detect the presence of the platform at a location it should not be at particular places in the operating cycle. Redundant position-sensing control switches can increase reliability but they do so at the expense of increased cost and circuit complexity. Furthermore, what happens if the two redundant switches operate from the same cam and that cam fails? A light beam sensing system adds considerable expense and circuit complexity and provide additional structure that can be damaged during use and therefore disable the system and require repair.

It is therefore an object and feature of the invention to fill the need for an independent, low cost and reliable backup system to stop the lifting platform at floor level if the primary position-sensing switch or control circuit should fail.

A further object and feature of the invention is to provide a second system that monitors the same event but is not linked or interdependent in any way on the primary monitoring system so that a failure in one system could not possibly affect the second system.

BRIEF SUMMARY OF THE INVENTION

The invention involves the monitoring of motor current, particularly the current in a motor driving the hydraulic pump of a hydraulic system, such as a hydraulic lift. The current is monitored by a digital logic system having a microprocessor controller. The motor current is examined by the digital logic for a particular motor waveform characteristic that indicates a state of the apparatus driven by the hydraulic system. The motor current is examined for an indication of an operational transition indicative of a hazardous occurrence and the detection of that hazard can be used to shut down further operation of the apparatus. More specifically, embodiments of the invention look for a sufficiently large change or slope in a characteristic of the motor current signal and interprets that slope as a signal that a malfunction has occurred.

The invention senses the motor current to provide a motor current signal and then filters the motor current signal to provide a filtered motor current signal consisting essentially of motor current signal components in the frequency range from a lower frequency boundary greater than zero Hz to an upper frequency boundary below substantially all the motor noise frequencies. The filtered motor current signal is compared to a first selected threshold level and a signal representing the occurrence of the operating transition is output when the filtered motor current signal exceeds the selected threshold level.

Figure 1:
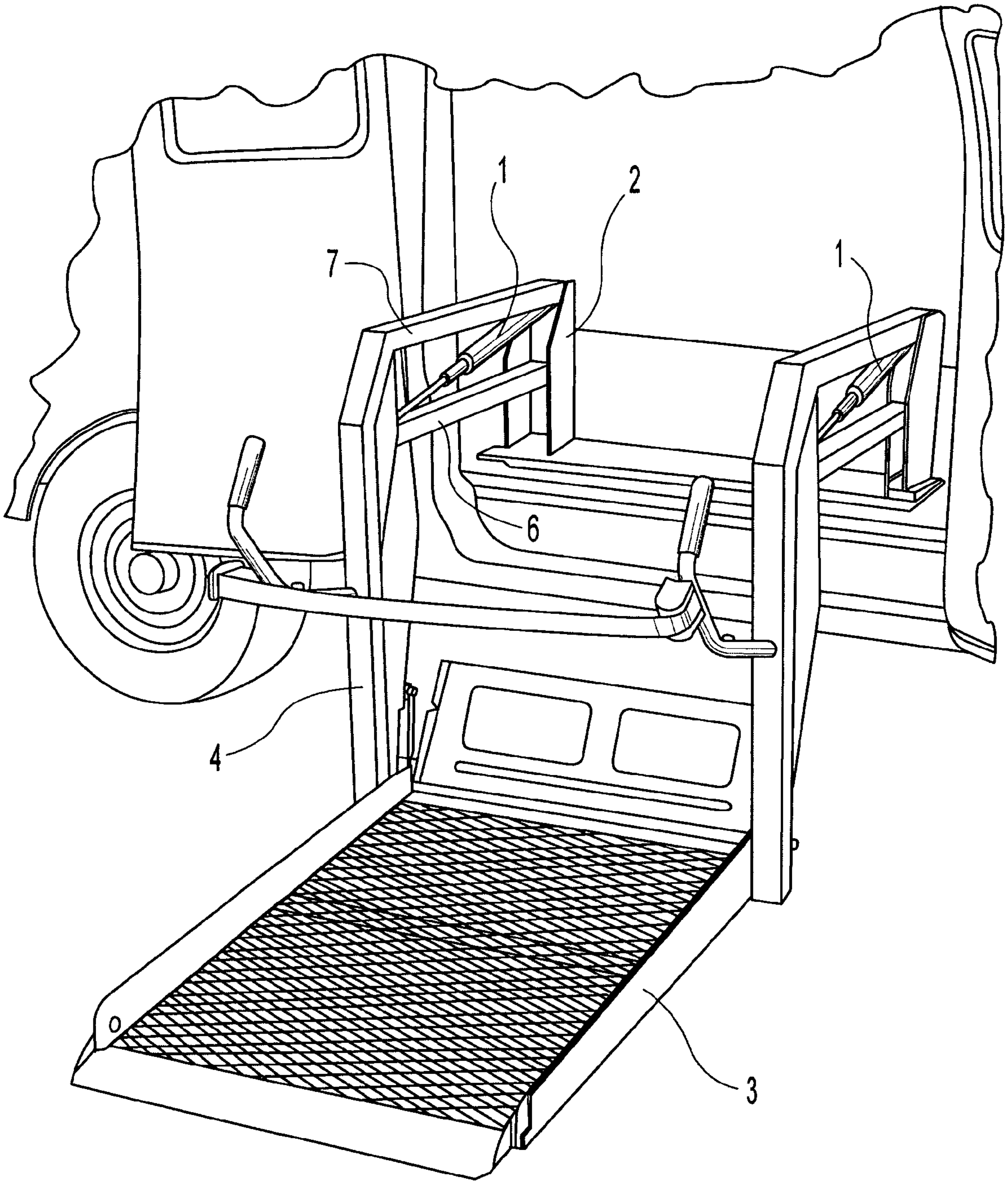
Fig. 1 (Prior Art)
FIG. 1 is a view in perspective of a common wheelchair lift that is commercially available from The Braun Corporation.
Figure 2:
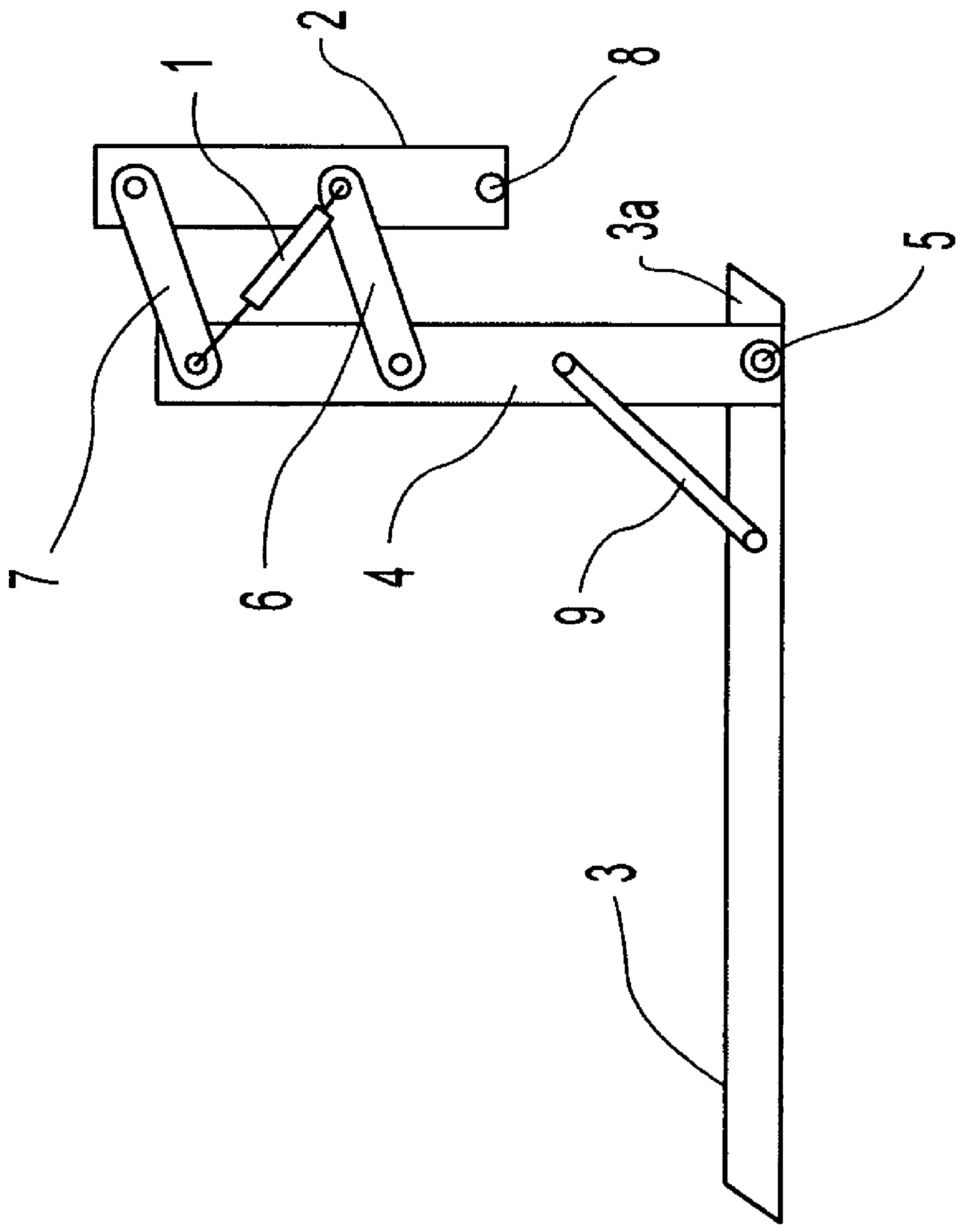
FIG. 2 is a side view of a typical single cylinder hydraulic wheelchair lift system.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected, or term similar thereto, is often used. They are not limited to direct connection, but include connection through other circuit elements where such connection is recognized as being equivalent by those skilled in the art. In addition, circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

The present invention is illustrated with respect to a wheelchair lift system that includes an electric motor driven hydraulic pump actuating a hydraulic cylinder to perform platform lifting and stowing functions. The invention monitors the electric motor load current to determine if the lifting platform is erroneously transitioning from its lifting cycle into its stowing cycle. Detection of the erroneous transition is used to provide a back up safety shut down of the hydraulic motor in the event that a primary position-sensing device, such as a limit switch, fails to sense the arrival of the platform at a particular position. However, the invention could be the primary position sensing device and also is adaptable and applicable to other systems having an electric motor powering a mechanical apparatus.

A Circuit Embodying The Invention

Figure 4:
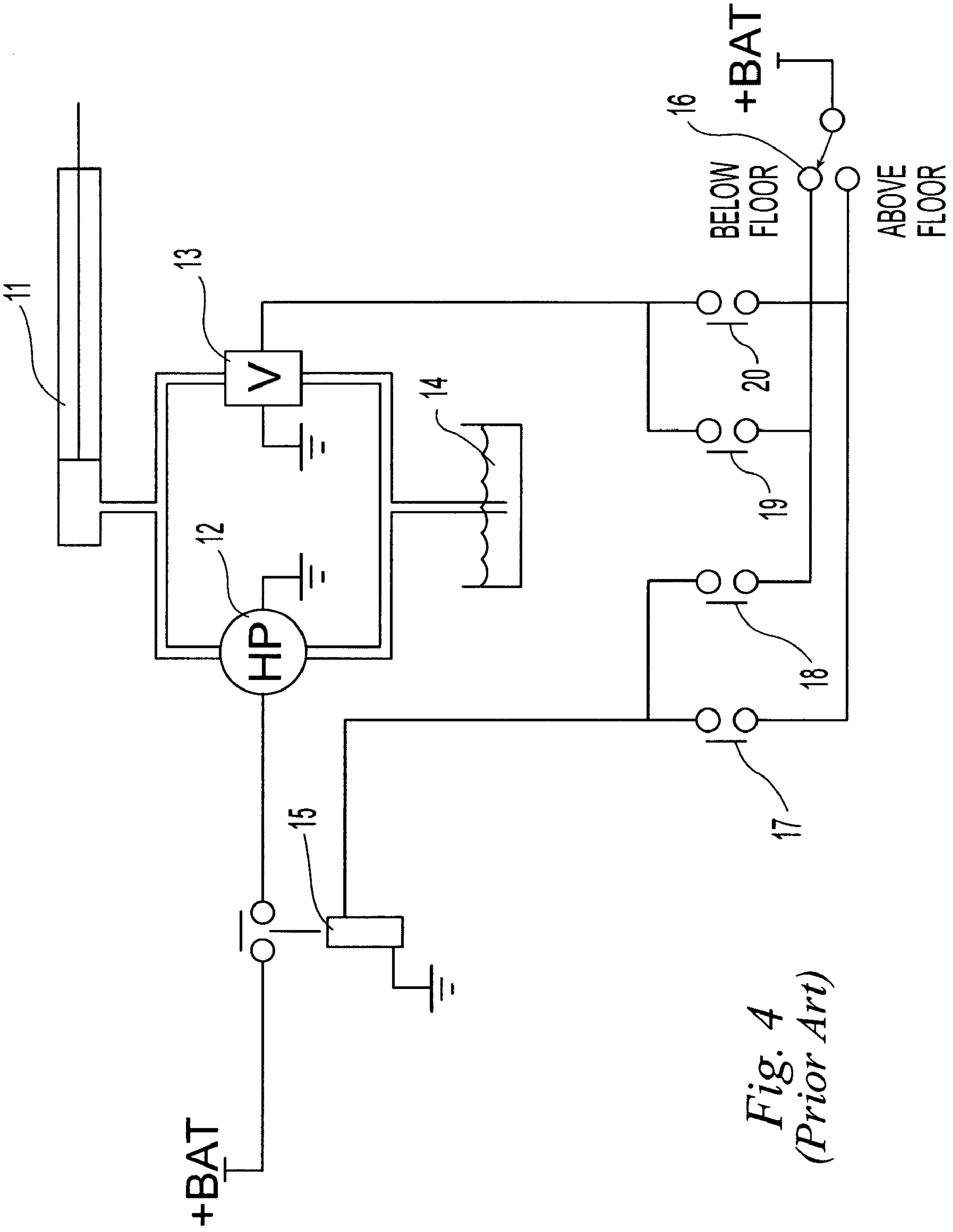
Fig. 4 (Prior Art)
FIG. 4 is a hydraulic and electrical schematic of a typical hydraulic cylinder operated wheelchair lifting system and platform stowing system.
Figure 5:
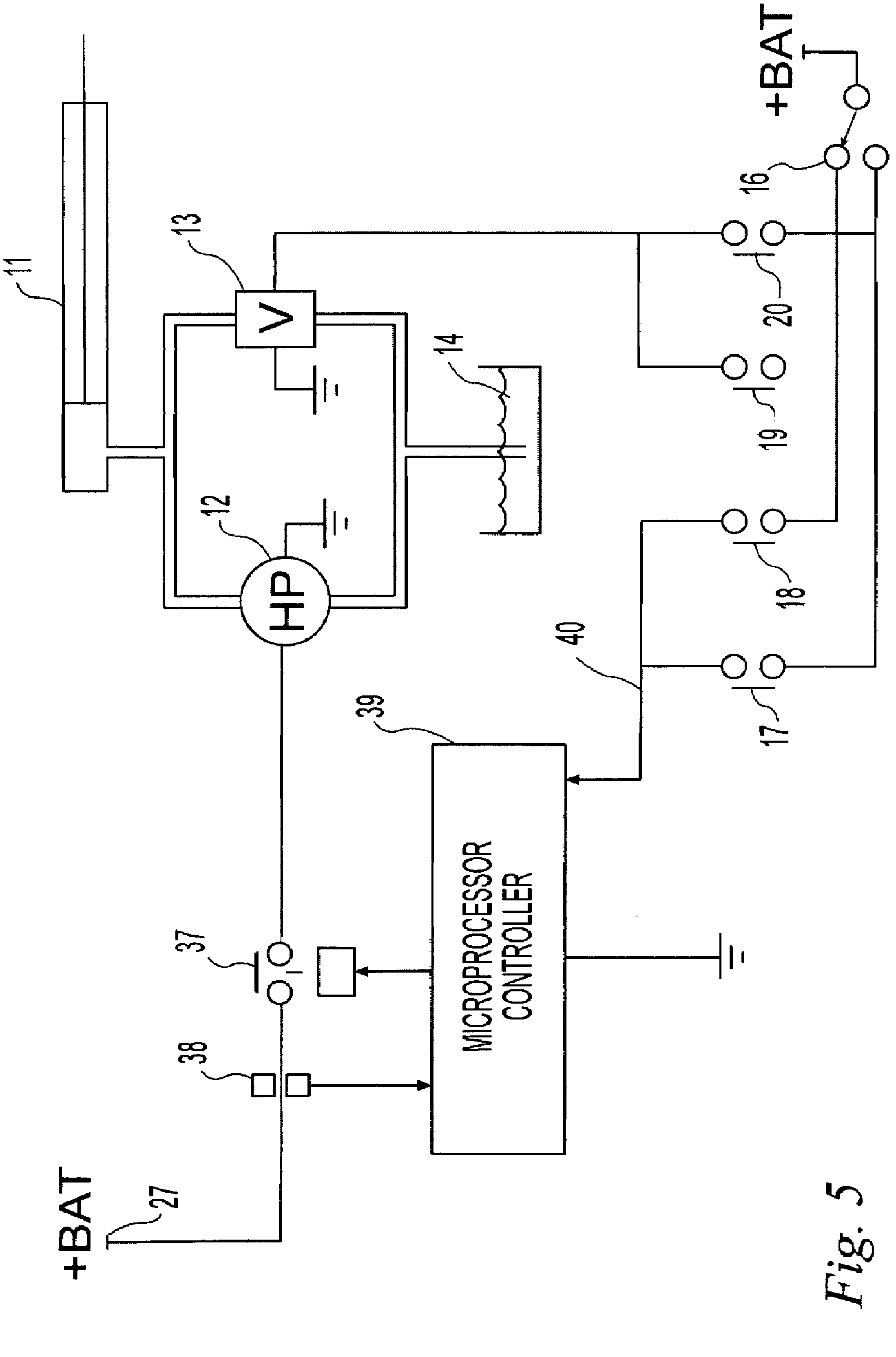
FIG. 5 is a hydraulic and electrical schematic of the preferred embodiment of the invention.

The components of the preferred embodiment of the invention are shown in FIG. 5. As is apparent from this schematic diagram, the hydraulic circuit, the high current, the power switch 37 and the low current control circuit are the same as illustrated in FIG. 4. Of course alternatively, two or more series connected power switches, as known in the prior art, can be used. In addition, the circuit includes a microprocessor controller 39 that has an output connected to the control input of the power switch 37 and a current sensor 38 connected to an input of the microprocessor controller 39. The microprocessor controller 39 controls and operates the power switch 37 in response to a control input 40 from the low current, manual control switches 17-20 that applies the same control signal described above to an input of the controller 39. The current sensor 38 monitors electric motor load current and provides the microprocessor controller with a signal representing the motor current. The embodiment illustrated in FIG. 5 only illustrates the components that are relevant to the invention being described. However, the principles illustrated in FIG. 5 and this accompanying description can be combined with other concepts and circuits.

The invention is based upon what is happening with the hydraulic cylinder during the lifting process and the stowing process and how that is reflected back into the electric motor. The hydraulic pump is a constant flow rate or displacement pump. Its flow rate is proportional to its speed and, if it encounters an increased flow resistance or load, the hydraulic pressure increases and the increased load is reflected back into the electric motor as increased motor load which in turn causes increased motor current. Therefore, motor current is an increasing function of hydraulic pressure; that is, as hydraulic pressure increases, motor current increases and as hydraulic pressure decreases, motor current decreases.

Mechanical and Hydraulic System Operation and Transitions

Figure 6:
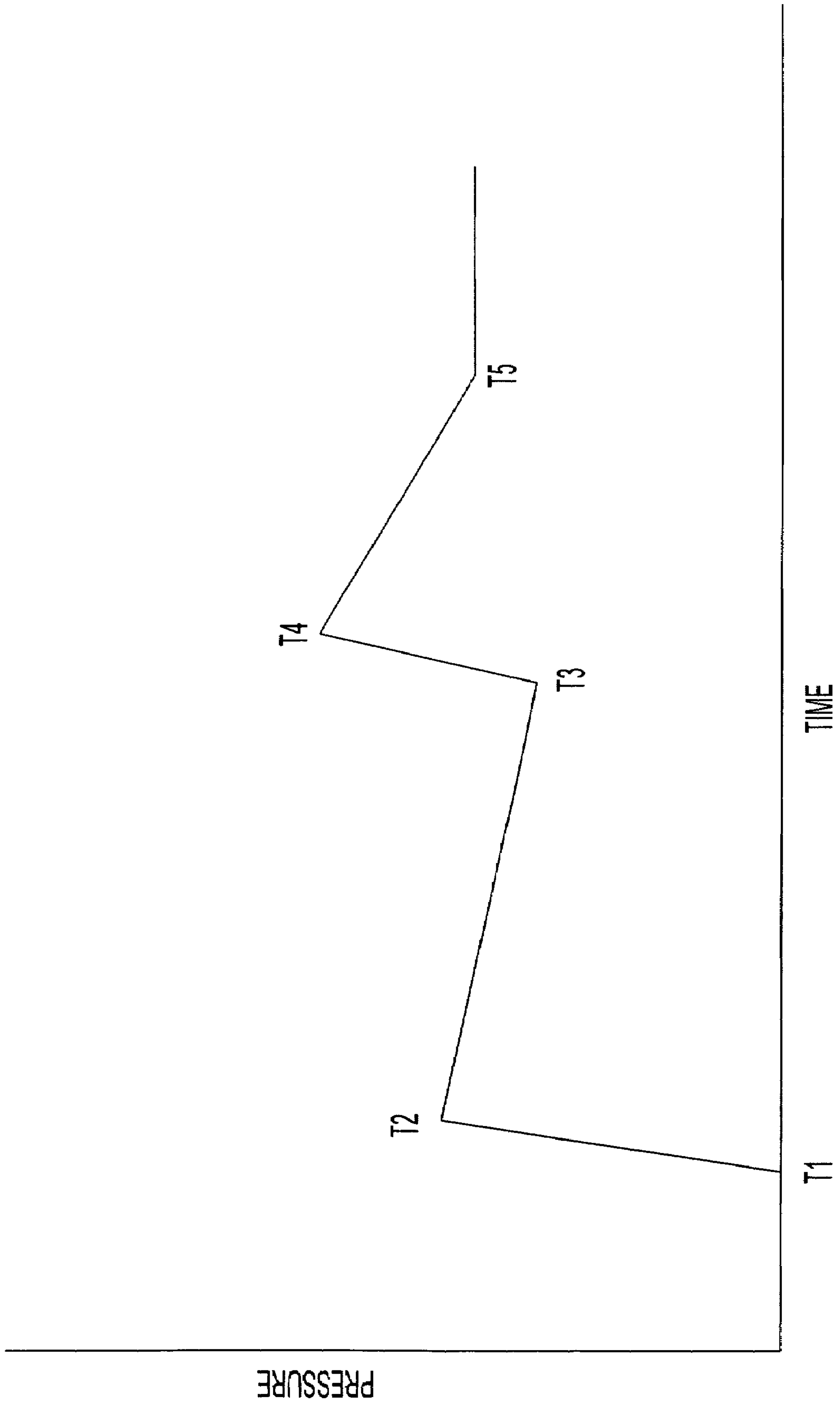
FIG. 6 is a graph of hydraulic pressure for a lift system as the platform is raised from ground level through its fully stowed position.

By examining the hydraulic cylinder pressure, which is also the hydraulic pump pressure, at various points during the lifting and stowing cycles, an analysis of the operation of this lifting system can be made. FIG. 6 illustrates changes in the hydraulic pressure of the hydraulic system as a function of time as the platform of a wheel chair lift is raised from ground level through floor level and into its stowed position. The vertical axis scale is quantitatively exaggerated to better illustrate the pressure transitions that occur. Looking at FIG. 6 and the hydraulic pressure, at point T1, which corresponds to the lift position illustrated in FIG. 3(A), the platform is at ground level and is supported by the ground, there is no mechanical load on the hydraulic cylinder and the hydraulic pressure is zero.

When pressure is applied to the cylinder 1, hydraulic fluid is injected into the lifting cylinder, cylinder pressure increases until the pressure is sufficient to fully support the platform's mass and the lift begins picking up the weight of the platform, the movable components of the lift and any user on the platform. The pressure is a function of the piston area of the lifting cylinder, the mass of the platform and any user on it and the mechanical advantage of the system. The mechanical advantage is a function of the cosine of the angle between the lifting cylinder and the pillars. This transition is represented by the interval from T1 to T2 in which T1 is the time of the zero pressure when the platform is supported on the ground and T2 is the time at which the full weight of the lifting platform is no longer supported by the ground, but now is supported by the hydraulic lifting cylinder. The transition from T1 to T2 represents the nearly infinitesimal increment of movement from resting on the ground to being lifted from the ground.

The interval between T2 and T3 is the time interval during which hydraulic fluid is further injected into the cylinder causing the platform to be raised from ground level to its floor level position as shown in FIG. 3A through FIG. 3C. Between points T2 and T3, as the lift rises, the mechanical advantage of the mechanical components of the lift changes as a result of the geometry of the lift and it essentially changes as a function of the change of the cosine of the angle between the hydraulic cylinder and the vertical pillars. More specifically, the force applied to the hydraulic cylinder by the lift decreases and therefore the hydraulic pressure also decreases as the platform rises within this interval from T2 to T3. The lifting cycle is complete when the platform reaches floor level and actuates position detecting limit switch 16 (FIGS. 4 and 5) and, under normal operating conditions, automatically stops. The platform is now fully lifted into a position allowing the user to exit or enter the platform to or from the vehicle.

It is important to note that the platform at that point encounters the stop 8 so that any further vertical movement of the pillar 4 instead of lifting the platform, would cause the platform to rotate around its pivot 5. Importantly, a significant change in mechanical advantage occurs when the platform reaches the floor stops 8. In any further upward motion of the platform beyond this point, the platform is acting as a lever with a fulcrum at the pivot 5 and a force applying moment arm from that fulcrum to the stop 8. The force applied at that moment arm distance results in the torque that pivots the platform from a horizontal to a vertical orientation. Any mass on the platform and the mass of the platform itself are no longer directly coupled to the lifting cylinder but are now first coupled through a second moment arm of the lever developed by platform 3, pivot 5 and platform stop 8. Small movements in vertical pillar 4 result in a large rotational movement of the platform 3. The force required to pivot that lever system becomes added to the system. The mass of the platform is multiplied by the ratio of (1) the moment arm distance from the pivot 5 to the center of mass of the platform and any load to (2) the moment arm from the pivot 5 to the stop 8. The result is that, when pivoting of the platform is initiated, the force of the weight of the platform multiplied by the lever arm ratio is additionally applied to the lifting hydraulic cylinder which must apply an equal and opposite force to cause the pivoting movement.

Figure 3:
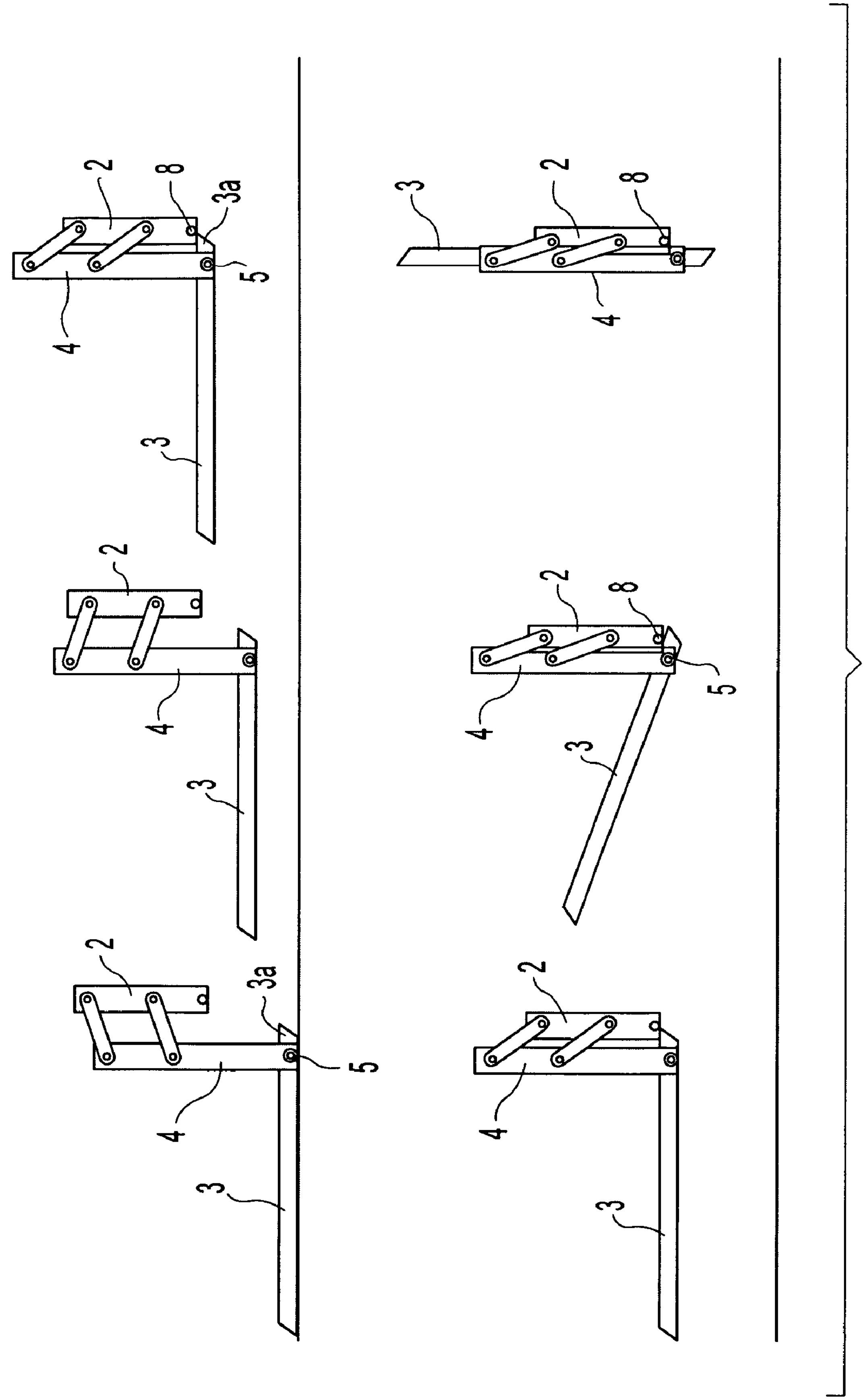
FIG. 3A through FIG. 3C depict the lifting cycle of the lifting platform from ground level to floor level.
FIG. 3D through FIG. 3F depict the stowing cycle of the lifting platform from vehicle floor level to its fully stowed position.

The stowing cycle begins at point T3 in FIG. 3 when hydraulic fluid is further injected into the lifting cylinder. Therefore, the transition from T3 to T4represents the substantial increase in hydraulic pressure required to initiate the pivotal stowing motion of the platform. In this interval, the cylinder pressure increases until the pressure is sufficient to fully support the now levered platform mass.

Between points T4 and T5, hydraulic fluid is further injected into the cylinder causing the platform to fold around the floor stop and into its stowed position. The transition between T4 and T5 represents the change in pressure as a result of the rotational movement of the platform from the position of FIG. 3(D) to the position of FIG. 3(F). The pressure required for this transition is a function of the cosine of the angle between the platform and a horizontal plane. This angle is increasing and the cosine is decreasing as the platform pivots. Therefore the loading applied is decreasing as the platform is lifted until the platform is eventually fully stowed in a vertical orientation. At that point there is no component of force applied to the cylinder that results from the lever arm and pivoting of the platform because the cosine of the angle between the platform and a vertical has become zero. There is no longer any leverage multiplier. At the fully raised position, the pressure of the hydraulic system again only supports the mass of the platform.

The point is that by lifting this platform from ground level all the way up to its stowed position, milestone events are encountered. The chief milestone event is the transition between the platform being at a horizontal lifting position at the floor level and the platform beginning to move from that horizontal lifting position into a vertical stowed position. That milestone is important because there should not be any person on the platform when the platform is being pivoted from the horizontal lifting position into a vertical stowed position.

Hydraulic pumps used in vehicle wheelchair lift systems are typically powered by 12 volt DC electric motors. The invention makes use of the observation that the changes in loading during the lifting of the lift and the resulting changes in hydraulic pressure, as described above, are reflected back into the motor as corresponding changes in motor current. During platform lifting cycles, the electric motor can draw between 35 and 95 amps depending on platform load. During platform stowing cycles, the electric motor typically draws 50 amps. The actual load currents drawn during the lifting and stowing cycles are a function of both the actual loads and the changing mechanical advantage of the system as it moves. Consequently, the milestone events represent transitions in the operation of the mechanical lift that are reflected back as motor current changes and transitions that can be monitored to detect the mechanical transitions of the lift. The load current waveform accurately models and tracks these changes. The invention monitors the motor current to determine when mechanical operating transitions, that are important to safety, have occurred. The invention monitors the current to detect operating transitions in the mechanical load that are caused by a change in the force applied by the mechanical apparatus on the prime mover. The monitored load change can be the result of changes in mechanical advantage resulting from changes in the motion of the mechanical system or the result of other increased mechanical loading, such as encountering a stop at the end of the stowing cycle.

Motor Current

Figure 7:
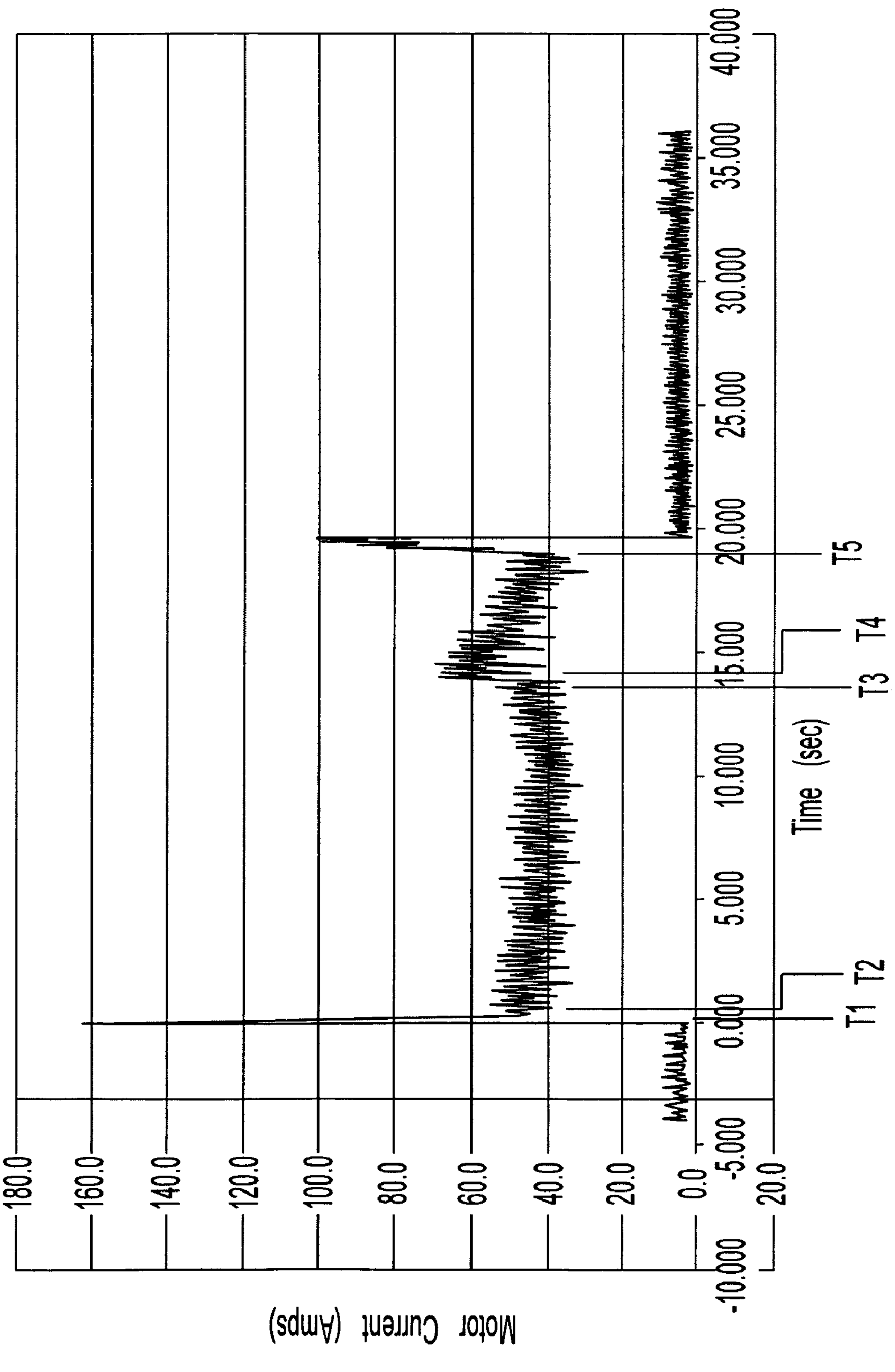
FIG. 7 is a graph of hydraulic motor current for a lift system as the platform is raised from ground level through its fully stowed position.

FIG. 7 is an oscillograph of motor load current vs. time for a typical hydraulic wheelchair lift system as its platform is raised from ground level through floor level all the way up to its stowed position with no stopping along the way. This is shown because this uninterrupted sequence is the unsafe operation that could occur if the switch 16 (FIGS. 4 and 5) would fail to operate properly and fail to stop the platform when it reached floor level. This oscillograph generally follows the waveform pattern of FIG. 6 but has relatively high frequency motor noise components superimposed upon it and also has a current spike at its beginning and another current spike at its end.

Between time 0 seconds (T1) and approximately time 13 seconds (T3), the platform is being raised from ground level to floor level. The changing mechanical advantages can be seen in the varying load current.

The electric motor is turned on at time 0. The initial current spike is the overlapping occurrence of two events that occur within the approximately 1 second time interval from T1 to T2. The first event is the usual initial startup, inrush current of a DC motor that is largely a function of the initial state of the motor with its rotor not rotating and the inductive reactance of the motor armature winding. This inrush current starts at T1 and typically lasts less than 250 milliseconds. As well known to those in the electric motor art, the initial current is high because the stationary rotor of the motor does not produce a back emf in the stator windings and therefore the motor input impedance is low resulting in a large initial current that decreases as the motor comes up to speed and induces the back emf in the stator winding. The second event that occurs in the interval from T1 to T2 is the increase of motor current as a result of the hydraulic pressure increasing sufficiently to lift the platform from the ground as described above.

From time T2 (at approximately 1 second) to time T3 (at approximately 13 seconds) the motor current slowly decreases and that decrease represents the transition from T2 to T3 in FIG. 6 for the reasons described above.

At time T3, the current rapidly increases because of the changing mechanical advantage of the system as described above and continues increasing to time T4 at approximately 14 seconds because the hydraulic pressure must increase to support and begin to pivot the platform then acting as a lever as described above. The change in the mechanical advantage as the lift transitions to being pivoted toward its vertical orientation is characterized by the dramatic increase in the power requirement of the motor to generate enough pressure to initiate the platform pivoting as a lever.

Between time T4 and time T5 (at approximately 19 seconds), the platform moves to its vertical stowed position, the force required to pivot the platform decreases and the motor current decreases as described above.

The last pulse in FIG. 7 is the spike occurring after T5 (at approximately 20 seconds) and is the result of the platform reaching a mechanical stop provided in prior art systems to engage the platform when it arrives in a vertical orientation. Once the platform is there, it can not be raised any more and the hydraulic pump pressure continually increases until the conventional control system locks the system pressure in the hydraulic cylinder by actuating a valve to hold the lift stationary in its fully stowed position and then shuts off the electric motor. The pressure increase that occurs after T5 in FIG. 7 is not illustrated in FIG. 6 but it can provide an additional signature that can be detected using the principles of the invention.

From the above it can be seen that there is a correlation between the hydraulic pressure and the current to drive the electric motor and the hydraulic pump. The most important thing to observe is that a significant transition occurs when the platform starts to go from the fully lifted but horizontal position of the platform shown in FIG. 3(D) to the stowed position illustrated in FIG. 3(F). This transition as illustrated in FIG. 6 begins at around 13 seconds on the oscillograph of FIG. 7.

Detection of the Transitions

An analysis of the current waveform of FIG. 7 in terms of its harmonic content shows that the current waveform of FIG. 7 is the sum of three principal components. The first component is the DC component. The DC component is a function of the total physical load on the system. That total load is essentially the sum of the mass placed on the lifting platform and the mass of the platform itself. The mass of associated parts is relatively small and can be ignored for qualitative analysis. If two people are on the lift as opposed to one, thus increasing the load, the DC component is just going to shift proportionally upwardly in a vertical direction on FIG. 7. There is no signal information in the DC component that would provide information about mechanical transitions of the lift mechanisms. The DC component can not provide an indication of anything happening with the lift other than how much overall gross weight is on the platform.

The second and third components of the waveform of FIG. 7 are the Fourier components within two frequency bands. The second component that can be extracted from the waveform consists of the high frequency Fourier components, and that is typically and principally between 30 hertz and 2 kilohertz. This high frequency component largely comes from the electric motor itself. It is a DC motor, it has an armature, it has start-up, current inrushes, and the armature windings are not identical, so as the motor rotates and it moves from one armature winding to another, its impedance slightly changes. Additionally, any motor brushes cause arcing and impedance variations. So the high frequency component is essentially the AC noise of the motor running. There is no useful information in that signal for detecting a transition of the lift mechanism although its presence indicates that the motor is running.

However, the waveform of FIG. 7 also has the specific intellectual information showing when the platform is transitioning. That information is available in the third component found in the frequency range from above 0 Hz, the DC component, and extending up to the motor noise component. Preferably, for practical purposes in designing circuitry as subsequently discussed, the AC components that are preferably used are in the range from 0.01 Hz to 2 Hz. The AC Fourier components in this range accurately reflect the changing mechanical advantage so that data in this frequency range can be used to detect the platform transition from its lifting mode to its stowing mode.

In order to detect this platform transition, the current waveform signal of FIG. 7 is passed through a band pass filter that blocks DC and also blocks substantially all of the motor noise. The filtered signal provides a signal that represents the rate of transition of the force applied to the mechanical load (e.g. the platform). The frequency band limits are defined in the conventional way by the half power points, i.e. the 3 dB down points. The term "substantially all of the motor noise" means that the upper boundary of the pass band is selected so that any remaining noise that is not filtered out is inconsequential in the sense that it does not defeat the operability. Because different electric motors will have different motor noise characteristics, the upper limit of the pass band can vary from system to system. As is common in the design of electrical circuitry, engineering tradeoffs or compromises are made to provide a circuit, such as a filter, that imperfectly filters but nonetheless provides a practical, useful result.

The lower limit of the passband is determined by the need to remove the DC component so that the filtered resulting signal is not affected by the total load on the system. The resulting signal should be a function of the mechanical movement of the system and not a function of the total load. For example, a 250 pound person on a lift may cause a motor current of 50 amps while a 300 pound person may cause a 60 amp motor current. The lower limit needs to be low enough to provide a signal that can represent the slowest transition that is expected. As examples based upon information theory, in order to obtain sufficient information in the signal, a 1 second transition would require a lower limit of 1 Hz, a 2 second transition would require 0.5 Hz, and a 4 second transition would require 0.25 Hz. However, as the lower limit is designed closer to 0 Hz, practical problems in designing an effective filter become more difficult. A conventional analog filter circuit requires a sharper cutoff as the lower limit is made closer to 0 Hz. A digital filter technique, using a digital filtering algorithm, becomes more complicated and requires more processor time to accomplish the filtering, which must be done in real time. As a useful compromise between these two factors and the need to have sufficient data points to assure that a digital algorithm will recognize a transition, I have found that the lower limit is preferably substantially 0.001 Hz and most preferably 0.01 Hz.

The upper limit of the passband needs to be low enough to eliminate substantially all of the motor noise but high enough to represent a relatively rapid operation transition. The more rapid the transition that is to be detected, the higher are the Fourier frequency components that are needed to represent it. Therefore, the upper limit must be high enough to provide a filtered signal that can signal the most rapid transition that is expected from the mechanical mechanism but low enough to eliminate enough motor noise to accomplish the purpose. I have found that an upper limit of 10 Hz is preferred but most preferably the upper limit is 2 Hz.

Although analog filtering can be used, preferably the microprocessor controller 39 (FIG. 5) uses the common dual integration and a summation technique to form a 0.01 Hz to 2 Hz band pass filter. The load current signal from the current sensor 38 is input to the controller 39 but a 250-msec delay in the processing of that signal during startup masks inrush current signals and prevents false triggering by the initial spike. After that delay, the motor current signal presented to the microprocessor by the current sensor is processed by the filter algorithm. The voltage gain of the filter is adjusted to produce a 10 to 1 signal ratio between platform lifting signal and the signal developed when the platform is in transition between lifting and stowing cycles.

The prior art extensively discloses the manner in which filters can be implemented using digital processing. An example is a 1995 publication by Texas Instruments under the title *Data Acquisition Circuits, Data Conversion and DSP Analog Interface.*

Figure 8:
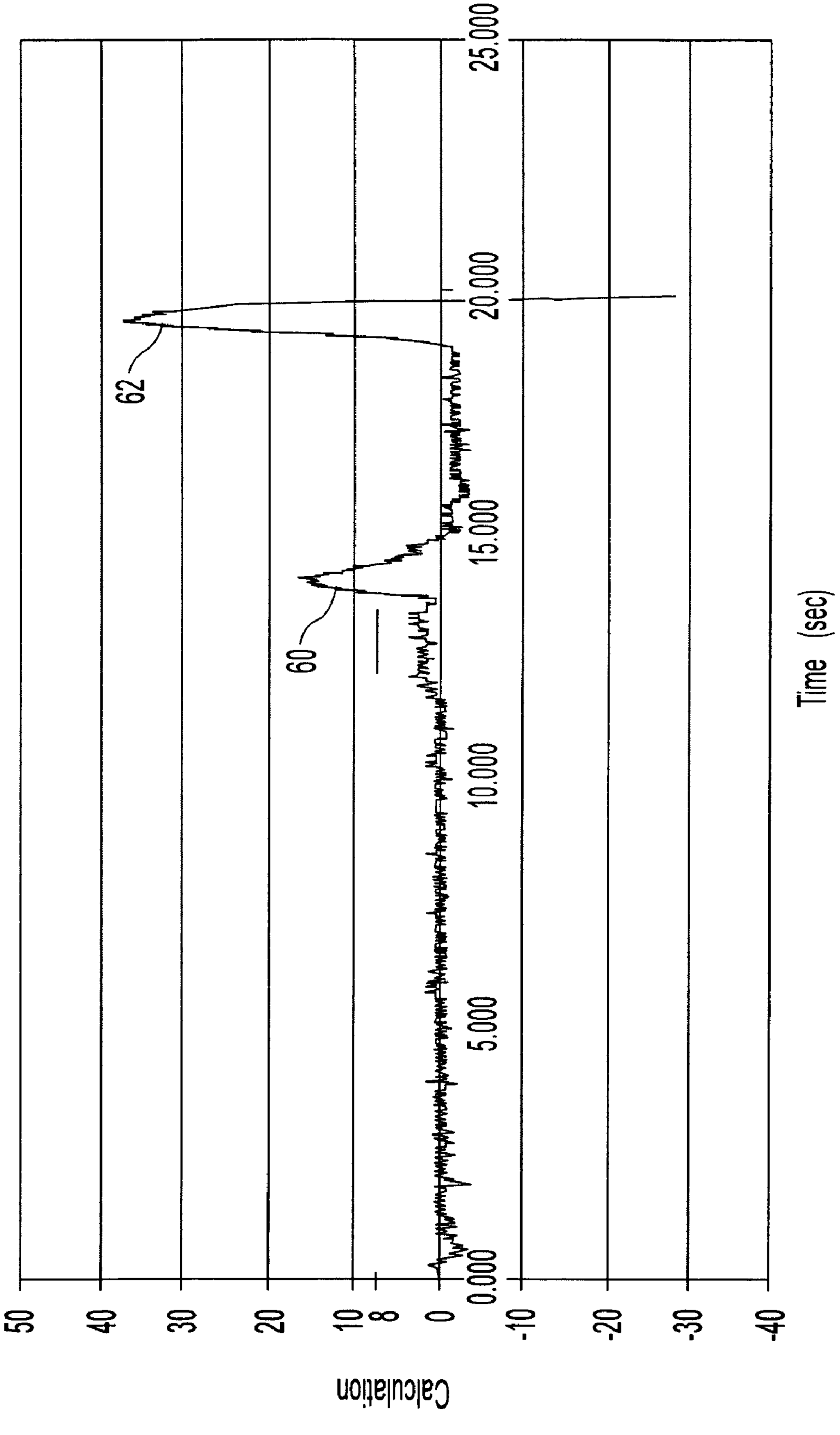
FIG. 8 is a graph of output of the band pass filter described in second feature of the current invention.

FIG. 8 is the waveform derived from the waveform of FIG. 7 by filtering it through the 0.01 Hz to 2 Hz band pass filter as described. The DC component is eliminated which is apparent because the graph is essentially centered at zero. The high frequency components that are being generated by the motor itself have also been substantially eliminated, leaving the information pertaining to the motion of the lift or other mechanical apparatus based upon the changing mechanical advantage of the platform and the resulting change in loading.

The first transition point 60 shows the signal going from zero up to a level of approximately 15 at approximately 14 seconds. That signal is the signature representing the change in the lift loading as the lift makes its transition from the lifting mode to the rotational folding mode. If the signal of FIG. 8 is monitored by the controller 39 looking for a transition from low to high (it could be from high to low, it depends on polarity, but in this case from low to high), that transition signal can be used to command the contactor 37 to immediately turn off the motor because this signal can only occur when the lift was not stopped by the position detecting switch 16 and instead is transitioning from its horizontal lifting position into its folding position. The signal is monitored by the controller 39 by comparing the filtered signal of FIG. 8 to a threshold value. The threshold value has a value greater than the filtered signal between 0 and the transition 60 at approximately 14 seconds. I prefer a threshold of 8 which is approximately midway between the value of the filtered signal before the transition 60 and the peak of the transition 60, although other values can be used. If the filtered signal level exceeds the threshold level, the microprocessor controller outputs a signal representing the occurrence of the unwanted transition to open the power switch and turn off the electric motor driving the hydraulic pump.

The waveform of FIG. 8 does not have the initial high frequency transition or spike which is filtered out because this process really needs to work based upon a slight delay. FIG. 8 shows that delay, preferably 250 msec, during which time the signal is ignored in order to start off with a clean waveform. This allows the circuit to settle down once the motor is started and before beginning to collect data to digitally perform the filtering in order to monitor in the 0.01 to 2 hertz frequency range looking for the transition that is the signature of the lift not being stopped by the position detecting switch and instead continuing on to transition from its horizontal lifting position into its stowed position.

So FIG. 8 is the filtered signal as the platform goes from ground level all the way up through the horizontal position, directly into the stowed mode. In operating the lift normally, the controller output signal shutting the wheelchair lift off would not occur because the mechanical position switch 16 would switch long before the signature pulse was detected. That signature pulse 60 would be generated only if the mechanical position switch were to fail. Under normal operating conditions the mechanical switches that sense that the platform has reached floor level would engage or change states before entering the transition into the lifting mode. So, if switch 16, in this case, were to operate, it would operate just before we would see this signature transition signal from the filter and it would dominate and cause the wheelchair lift to stop operating. But, if that switch 16 were to fail the circuit would generate this signature pulse. So the invention provides a back-up to the mechanical position switches. If this signature pulse occurs, it means that there is an error in one of the primary position detecting switches. It is a back-up and never really occurs unless there is a primary system failure.

If the passenger gets off the lift and then signals the lift to now fold all the way up, the transition would not be detected because of the initial 250 millisecond delay. So, if the user got off the platform and reenergized the lift to initiate movement to the stowed position, you would not see that signature pulse because it is of shorter duration than the 250 millisecond delay. On FIG. 8 that pulse 60 looks like it is a lot longer than 250 milliseconds because the plot of FIG. 12 is the result of the digital filtering and it is actually a digital, double integration and summation technique that is common in the data processing art. So, there is an amount of persistence in the signal. The actual input signal, which is observed from the actual oscillograph of the data, has a much, much higher di/dt rate than apparent from FIG. 12 and so the signature pulse falls within this 250 millisecond time lapse. The controller 39 is essentially looking for a significant change in the slope of the sum of the low frequency components that pass through the filter during the time interval after the initial ¼ second time delay and until the position detecting switch 16 signals the arrival at the platform at the top, horizontal position.

Therefore, a very important aspect of the invention is the recognition and application of the fact that the information that signals the occurrence of the signature transition that the system is looking for is available in the motor current in the 0.01 hertz to 2 hertz range, and that is the signal that is processed to extract the needed information. However, it should also be apparent that the invention is not limited to this precise frequency range because, from the above explanation, it will be apparent that those skilled in the art can accomplish a detection of the signature transition in the motor current by other filtering techniques and with other frequency ranges. The principle of this aspect of invention is that embodiments of the invention look for a slope in a characteristic of the motor current signal, such as illustrated at approximately 14 seconds in FIGS. 7 and 8, and interpret that slope as a signal that a malfunction has occurred and the remedy is to immediately shut the motor off. It is intended as a back-up, not the primary way of controlling the lift.

Detecting the Stowed Position

The principles and techniques of the invention as described above can also be applied to detecting a second operating transition, such as the arrival of the lift platform at its stowed, vertical position against a stop. This is done by incorporating a second threshold level into the program of the controller 39. Referring to FIG. 8, as described above, the pulse 62 is the result of increased motor current if the hydraulic cylinder forces the platform against a stop after it arrives at its vertical, stowed position. Since the pulse 62 is considerably larger than the pulse 60, a second threshold between the peaks of these pulses can be used. When that second threshold is exceeded, in this case both thresholds are exceeded, the controller 39 can output a signal that represents the occurrence of the second operating transition and stop the electric motor. For example, since normal operating current is in the range of 40 to 60 amps and the current usually exceeds 100 amps when the stop is encountered, the second threshold may be at a level corresponding to 85 amps.

Detecting the Presence of a Passenger on the Platform

The presence of a passenger on the platform when the lift begins to pivot from its horizontal position at vehicle floor level to its stowed position can also be detected by using the principles and techniques of the invention. Although the transition or pulse 60 is not detected when there is no passenger on the platform because of the 250 msec delay as described above, the presence of a passenger can be detected because the continued presence of the mass of the passenger on the platform would extend the transition well beyond the 250 msec delay and substantially increase the load on the platform and the hydraulic pressure required to initiate the pivot motion of the platform and therefore would also substantially increase the motor current.

Of course each different mechanical apparatus will have different operating transitions, depending upon its mechanical configuration, the transitions will occur at different times and the pulses which are the signature of the transitions will have different levels.

Alternatives

As known to those skilled in the art, there are a variety of commercially available, non-microprocessor based controllers that can provide the controller functions and therefore are equivalent and can be substituted for the microprocessor controller or can separately perform the filtering and other functions. The sensing functions can be performed by separate circuitry or can be provided on-board a controller. Suitable controllers can include equivalent digital and analog circuits available in the commercial marketplace. Examples of controller components include field programmable gate arrays, programmable analog filters, digital signal processors, field programmable analog arrays and logic gate arrays. Such circuits can be constructed of diodes and transistors. Therefore the term "controller" is used to generically refer to any of the combinations of digital logic and analog signal processing circuits that are available for performing the logic and signal processing operations described above.

Additionally, it is not necessary that the described microprocessor controller be dedicated to or limited to operation with the present invention. As those skilled in the art will recognize, such controllers can control multiple machines and circuits simultaneously. As a particular example, modern vehicles are equipped with one or more microprocessors that receive sensed data and control many devices on the vehicle, including the engine components. The circuit of the present invention can also be controlled by such an on board microprocessor and the circuit components can communicate with it over a vehicle data bus connected to that microprocessor.

Another example of applying the principles of the invention to detect an operating transition of a mechanical apparatus is an electric motor driven winch using a cable to pull an object from a first position to a second position where the load increases substantially if the winch continues to wind the cable after the object reaches the second position. For example, a winch driven by a dc electric motor is commonly used on a dump truck to pull a covering tarp across the top of a load in the truck bed in order to prevent spillage of bed contents as the truck is traveling along a roadway. If the winch pulls the tarp beyond its fully extended or stretched position, it is likely that the tarp will be torn where the cable is connected to the tarp. Because pulling the tarp across the top of the bed contents exerts a smaller load upon the electric motor than pulling on a stretched or fully extending tarp, that load increase may be detected using the principles of the invention described above. When the load increase is detected, the detected increase can be used to interrupt the current to the electric motor. Alternatively, physical stops can be placed to similarly increase the load when the cable has moved the tarp the appropriate distance. Such stops can be engaged by the tarp or other object being moved by the winch cable or engaged by a structure attached to the cable.

While certain preferred embodiments of the present invention have been disclosed in detail, it is to be understood that various modifications may be adopted without departing from the spirit of the invention or scope of the following claims.

The invention claimed is:

1. A method for detecting an operating transition of a mechanical apparatus driven by a hydraulic prime mover comprising a hydraulic pump driven by an electric motor, the operating transition causing a change in the force applied by the mechanical apparatus on the prime mover, the method comprising:

(a) sensing the motor current to provide a motor current signal;

(b) filtering the motor current signal to provide a filtered motor current signal consisting essentially of motor current signal components in the frequency range from a lower frequency boundary greater than zero Hz to an upper frequency boundary below substantially all the motor noise frequencies;

(c) comparing the filtered motor current signal to a first selected threshold level; and (d) outputting a signal representing the occurrence of the operating transition when the filtered motor current signal exceeds the selected threshold level.

2. A method in accordance with claim 1 wherein the frequency range is from not less than substantially 0.001 Hz to not more than substantially 10 Hz.

3. A method in accordance with claim 2 wherein the frequency range is from substantially not less than 0.01 Hz to substantially not more than 2 Hz.

4. A method in accordance with claim 1 and further comprising:

(a) the comparing step including comparing the filtered motor current signal to a plurality of selected threshold levels;

(b) outputting a first signal representing the occurrence of a first operating transition when the filtered motor current signal exceeds one of said selected threshold levels but does not exceed another of the threshold levels; and (c) outputting a second signal representing the occurrence of a second operating transition when the filtered motor current signal exceeds both of said selected threshold levels.

5. A method in accordance with claim 1 wherein the mechanical apparatus is a wheel chair lift having a platform deployable from a generally vertical orientation within a vehicle by pivoting down to a generally horizontal orientation substantially level with a floor of the vehicle and then descending to a ground level, the platform also ascending from the ground level to said horizontal orientation and then pivoting up to said vertical orientation against a stop, wherein:

the first selected threshold level is greater than the filtered motor current signal when the platform is ascending from the ground level to said horizontal orientation and less than the maximum measured filtered motor current signal when the lift transitions from ascending to pivoting upwardly.

6. A method in accordance with claim 5 wherein the threshold level is substantially 50% of the maximum measured filtered motor current signal when the lift transitions from ascending to pivoting upwardly.

7. A method in accordance with claim 5 wherein the threshold level is substantially 80% of the maximum measured filtered motor current signal when the lift transitions from ascending to pivoting upwardly.

8. A method in accordance with claim 5 and further comprising:

(a) the comparing step comprising comparing the filtered motor current signal to at least two selected threshold levels, the first selected threshold level being greater than the filtered motor current signal when the platform is ascending from the ground level to said horizontal orientation and less than the maximum measured filtered motor current signal when the lift transitions from ascending to pivoting upwardly, the second selected threshold level being greater than the maximum measured filtered motor current signal when the lift transitions from ascending to pivoting upwardly and less than the maximum measured filtered motor current signal when the lift engages the stop;

(b) outputting a first signal representing a transition from ascending to pivoting upwardly when the filtered motor current signal exceeds the first threshold level but does not exceed the second threshold level; and (c) outputting a second signal representing a transition from pivoting upwardly to engaging the stop when the filtered motor current signal exceeds the second threshold level.

9. A method in accordance with claim 5 wherein the frequency range is from not less than substantially 0.001 Hz to not more than substantially 10 Hz.

10. A method in accordance with claim 9 wherein the frequency range is from substantially not less than 0.01 Hz to substantially not more than 2 Hz.

11. A circuit for detecting an operating transition of a mechanical apparatus driven by a hydraulic prime mover comprising a hydraulic pump driven by an electric motor, the operating transition causing a change in the force applied by the mechanical apparatus on the prime mover, the circuit comprising:

(a) a motor current sensing circuit connected in a motor power supply circuit to provide a motor current signal representing motor current;

(b) a frequency filter connected to receive the motor current signal for filtering the motor current signal to provide a filtered motor current signal consisting essentially of motor current signal components in the frequency range from a lower frequency boundary greater than zero Hz to an upper frequency boundary below substantially all the motor noise frequencies; and (c) a comparison circuit connected to receive and compare the filtered motor current signal to a first selected threshold level and for outputting a signal representing the occurrence of the operating transition when the filtered motor current signal exceeds the selected threshold level.

12. A circuit in accordance with claim 11 wherein the filter and the comparison circuit comprise a microcontroller programmed with an algorithm for performing the filtering and the comparing operations and the output signal representing the occurrence of the operating transition is a signal within the microcontroller for use in control of the hydraulic prime mover.

13. A circuit in accordance with claim 12 wherein the mechanical apparatus is a wheel chair lift.

* * * * *